US008099405B2

(12) United States Patent
Vayssière (10) Patent No.: US 8,099,405 B2
(45) Date of Patent: Jan. 17, 2012

(54) SEARCH ENGINE SOCIAL PROXY

(75) Inventor: Julien J. P. Vayssière, Red Hill (AU)

(73) Assignee: SAP AG, Walldorf (DE)

( * ) Notice: Subject to any disclaimer, the term of this patent is extended or adjusted under 35 U.S.C. 154(b) by 1860 days.

(21) Appl. No.: 11/024,094

(22) Filed: Dec. 28, 2004

(65) Prior Publication Data

US 2006/0143160 A1    Jun. 29, 2006

(51) Int. Cl.
*G06F 7/00* (2006.01)
*G06F 17/30* (2006.01)

(52) U.S. Cl. ........ 707/706; 707/709; 707/770; 715/234; 715/236

(58) Field of Classification Search .................. 707/3–7, 707/706, 709, 770; 715/234, 236
See application file for complete search history.

(56) References Cited

U.S. PATENT DOCUMENTS

| | | | |
|---|---|---|---|
| 6,801,906 B1 * | 10/2004 | Bates et al. | 707/3 |
| 6,832,218 B1 * | 12/2004 | Emens et al. | 707/3 |
| 6,873,982 B1 * | 3/2005 | Bates et al. | 707/7 |
| 7,062,561 B1 * | 6/2006 | Reisman | 709/227 |
| 2002/0129014 A1 * | 9/2002 | Kim et al. | 707/5 |
| 2003/0120654 A1 * | 6/2003 | Edlund et al. | 707/7 |
| 2005/0097160 A1 * | 5/2005 | Stob | 709/200 |
| 2005/0131866 A1 * | 6/2005 | Badros et al. | 707/3 |
| 2005/0149507 A1 * | 7/2005 | Nye | 707/3 |
| 2005/0154723 A1 * | 7/2005 | Liang | 707/3 |
| 2005/0177562 A1 * | 8/2005 | Raciborski | 707/3 |
| 2005/0192953 A1 * | 9/2005 | Neale et al. | 707/4 |
| 2005/0256848 A1 * | 11/2005 | Alpert et al. | 707/3 |
| 2005/0278317 A1 * | 12/2005 | Gross et al. | 707/3 |
| 2006/0015498 A1 * | 1/2006 | Sarmiento et al. | 707/6 |
| 2006/0064411 A1 * | 3/2006 | Gross et al. | 707/3 |
| 2006/0116994 A1 * | 6/2006 | Jonker et al. | 707/3 |
| 2006/0129533 A1 * | 6/2006 | Purvis | 707/3 |
| 2006/0173830 A1 * | 8/2006 | Smyth et al. | 707/3 |
| 2006/0190308 A1 * | 8/2006 | Janssens et al. | 705/5 |
| 2006/0235860 A1 * | 10/2006 | Brewer et al. | 707/100 |
| 2006/0282408 A1 * | 12/2006 | Wisely et al. | 707/3 |

OTHER PUBLICATIONS

Roy Goldman & Jennifer Widom—"WSQ/DSQ: A Practical Approach for Combined Querying of Databases and the Web"—Proceddings of the 2000 ACM SIGMOD International Conference on Management of Data, vol. 29, Issue 2, Jun. 2000 (pp. 285-296).*
Judit Bar-Ilan—"Methods for Measuring Search Engine Performance over time"—Journal of the American Society for Information Science and Technology—Feb. 15, 2002 (pp. 308-319).*
My Google Search, http://www.mygooglesearch.com (2004).
How to Use My Google Search, http://www.mygooglesearch.com/usage.php (2004).
How My Google Search Works, http://www.mygooglesearch.com/howitworks.php (2004).

(Continued)

*Primary Examiner* — John E Breene
*Assistant Examiner* — Anh Ly
(74) *Attorney, Agent, or Firm* — Schwegman, Lundberg & Woessner, P.A.

(57) ABSTRACT

A technique for enhancing the results of an existing online search engine involves re-ordering the results of a search according to the feedback provided by a user community to previous similar searches. In an embodiment, the technique is fully backward-compatible with existing online search engines. In an embodiment, feedback is collected by an intermediary that sits in-between a client and a server. The intermediary intercepts requests and, for some, modifies the results. In this way, the technique can enhance the results of searches addressed to online search engines such as google.com, while being non-intrusive to an online search engine and a client browser.

20 Claims, 8 Drawing Sheets

OTHER PUBLICATIONS

ResearchBuzz "User-Guided Search Refining in Google" http://www.researchbuzz.org/archives/002060.shtml 2004.

The Internet Society RFC 2616 (rfc2616)—Hypertext Transfer Protocol—HTTP/1.1 (1999).

* cited by examiner

| Search Expression | URL | Count | Status |
|---|---|---|---|
| apple aardvark | www.appleaard.com | 2 | 503 |
| bunny baseball | www.baseball.com | 27 | 200 |
| ... | ... | ... | ... |
| zylophone zenophobia | www.wacky.org | 1 | 200 |

| Search Expression | Page # | Content |
|---|---|---|
| apple aardvark | 1 | PAGE 1 |
| apple aardvark | 2 | PAGE 2 |
| ... | ... | ... |
| apple aardvark | M | PAGE M |
| bunny basketball | 1 | PAGE 1 |
| bunny basketball | 2 | PAGE 2 |
| ... | ... | ... |
| zylophone zenophobia | N | PAGE N |

SEARCH ENGINE SOCIAL PROXY

BACKGROUND

This application relates generally to computer applications and systems. In particular, the invention is related to search engines.

Search engines such as google.com work by returning a ranked list of pages in response to a query submitted by a user. A key component of search engines such as that provided by Google is the ranking algorithm, which is an algorithm that, given all the pages that match a user query, presents these pages by relevance. In operation, on submission of a query by a user, the search engine searches its database of indexed pages for pages that match the query. It then organizes the matches by order of relevance using the ranking algorithm, and returns the results to the user in the form of one or more web pages.

Despite the advantages of incorporating a ranking algorithm in a search engine, ranking algorithms can also be a weakness. Since ranking algorithms are very mechanical in nature, they are not particularly good at guessing what a user may mean by the few keywords entered into a query. In other words, the ranking algorithm does not know the context of the user's query, and, as a consequence, may in some circumstances provide sub-optimal ranking of some queries.

Enhancing the ranking algorithm has a natural limit. The search engine has to reply solely on the query expression and the content of the pages for ranking pages. For example, it is not possible for a search engine to determine if the results for the search "Paris Hilton" should rank first pages about the person named Paris Hilton, or about the Hilton hotel in Paris.

SUMMARY

A technique for enhancing the results of an existing online search engine involves re-ordering the results of a search according to the feedback provided by a user community to previous similar searches. The feedback provided by a first group of users (e.g., travel professionals) and a second group of users (e.g., college students), would likely help in disambiguating a search such as "Paris Hilton". In an embodiment, the technique is fully backward-compatible with existing online search engines. For example, in an embodiment, the technique may not require any modification to the search engine or the web browser that a user employs.

In an embodiment, the technique facilitates a layer of human feedback on top of regular online search engines. The human feedback is collected by an intermediary that sits in-between a client and a server. The intermediary intercepts requests and, for some, modifies the results. In this way, the technique can enhance the results of searches addressed to online search engines such as google.com, while being non-intrusive to an online search engine and a client browser. In fact, the user does not even need to know that there exists an intermediary that is re-ordering search results.

A method according to an aspect of the technique may include receiving a request to a search engine from a user. The request may include a search expression. The method may further include sending the request to the search engine. For example, the request may be received at an intermediary, which then sends the request to the search engine. The method may further include receiving a response from the search engine. Typically, responses from search engines include search results.

In an embodiment, if prior history is associated with a search expression, search results that are also associated with the search expression may be sorted. In addition, a first page of the search results may be sent to a user that requested the search results.

A system according to an aspect of the technique may include a first network such as, for example, a local area network (LAN) and a second network such as, for example, the Internet. In an embodiment, an intermediary between the first network and the second network may be configured to intercept a request for search results from a client coupled to the first network. The intermediary may be further configured to intercept search results from a search engine. The intermediary may be further configured to intercept another request from the client for a URL that was included in the search results. For example, a user at the client may have clicked on a link to the URL that was provided in the search results. In an embodiment, the intermediary may associate the URL with the search expression that was used to generate the search results at the search engine.

An intermediary according to an aspect of the technique may include a client connection logic and a server connection logic. In an embodiment, the intermediary may further include repository update logic configured to update a repository based on requests from a client and responses to the client. In another embodiment, the intermediary may further include search results re-ordering logic configured to re-order search results from responses in accordance with a repository.

BRIEF DESCRIPTION OF THE DRAWINGS

Embodiments of the invention are illustrated in the figures. However, the embodiments and figures are illustrative rather than limiting; they provide examples of the invention.

In the figures, similar reference numerals may denote similar components.

DETAILED DESCRIPTION

Figure 1:
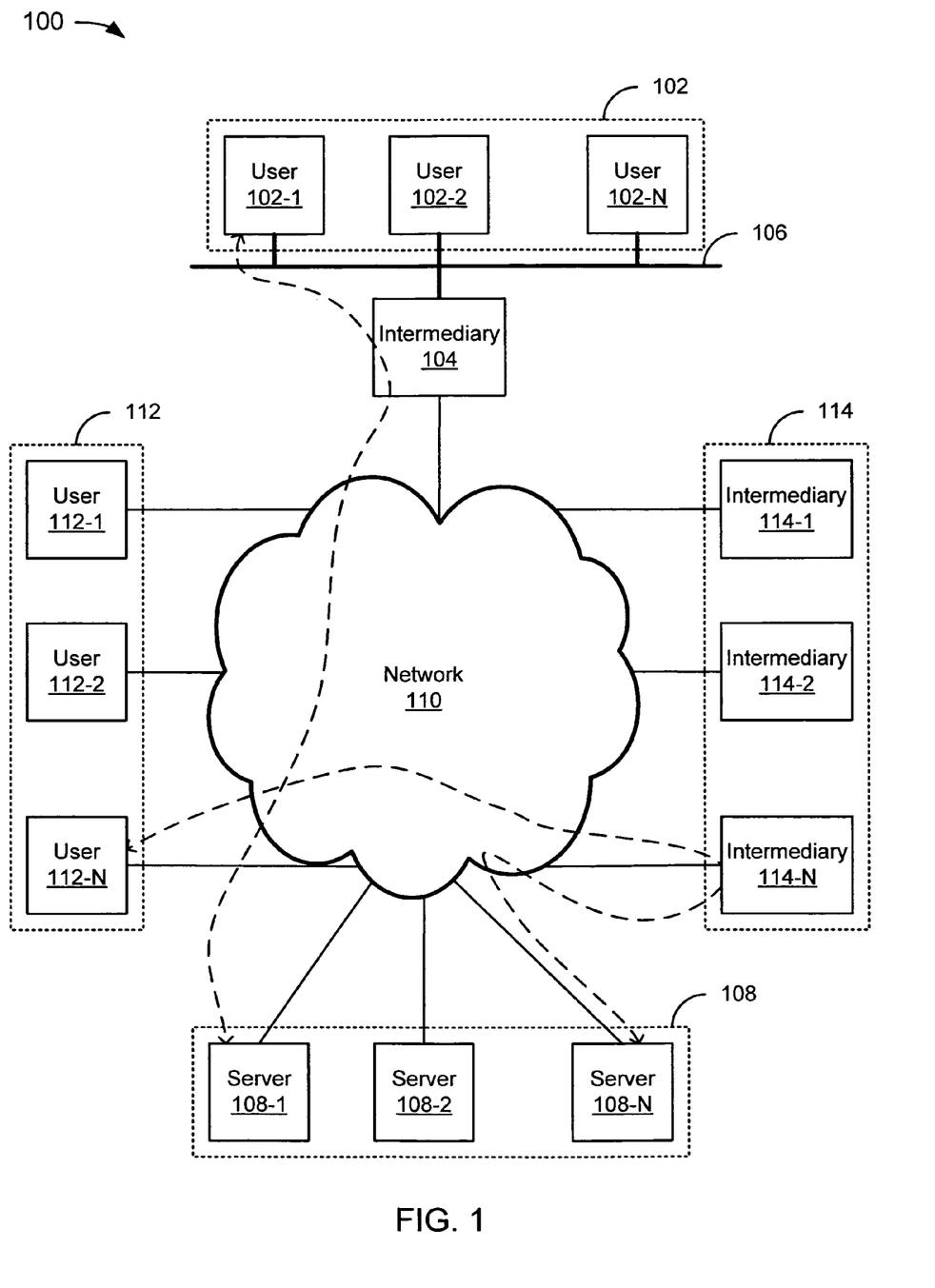
FIG. 1 depicts a conceptual view of a system according to an embodiment.

FIG. 1 depicts a conceptual view of a system 100 according to an embodiment. The system 100 includes users 102-1 to 102-N (referred to collectively as user community 102, an intermediary 104, a local network 106, servers 108-1 to 108-N (referred to collectively as servers 108), a network 110, users 112-1 to 112-N (referred to collectively as user community 112), and intermediaries 114-1 to 114-N (referred to collectively as intermediaries 114). The system 100 may include other user communities (not shown).

In the example of FIG. 1, the user community 102 is coupled to the intermediary 104 via the local network 106. As is known in the art of computer networking, each of the users 102-1 to 102-N may be coupled to the intermediary 104 with one or more of a variety of computing devices, such as, for example, a personal computer, workstation, PDA, or mobile phone. The intermediary 104 may act as a gateway for the user community 102.

In the example of FIG. 1, the intermediary 104 may be implemented as, for example, an HTTP proxy server or as a Web server that presents a web front-end to the user community 102 and communicates with the servers 108 at a backend. If implemented as an HTTP proxy server, the intermediary 104 presents the user community 102 an HTTP proxy interface. A user of the user community 102 may modify preferences associated with a web browser to use the HTTP proxy server. If implemented as a web server, the intermediary 104 includes a web site that has a user interface distinct from the servers 108. A web site such as http://www.mygooglesearch.com/ is an example of such a Web front-end to a search engine. A discussion of this web site may be found at http://www.researchbuzz.org/archives/002060.shtml, which is incorporated herein by reference. Other notable functions of the intermediary 104 are described later with reference to FIGS. 2 and 3.

In the example of FIG. 1, the local network 106 may be a local area network (LAN), an intranet, a wide area network (WAN), or some other network type. It should be noted that the user community 102 may or may not be limited to access of the network 110 through the intermediary 104.

In the example of FIG. 1, the servers 108 may be coupled to the network 110 in a manner that is known in the art of computer networking. For example, the servers 108 may be coupled to the network 110, for example, through a gateway computer or a web server computer. One or more of the servers 108 may include an online search engine, such as is provided by, for example, Google, Yahoo!, or Alta Vista. The network 110 may be, for example, the Internet. In operation, as illustrated in FIG. 1 with a dashed double arrow, a user from the user community 102, such as the user 102-1, may access a server, such as the server 108-1 through the intermediary 104 and the network 110.

In the example of FIG. 1, the user community 112 is similar to the user community 102, but the users 112-1 to 112-N may have independent access to the network 110. For example, a user 112-1 may be coupled to the network 110 through, for example, a modem interface, while a user 112-2 may be coupled to the network 110 through, for example, a gateway computer. The intermediaries 114 may be accessed via the network 110 by the user community 112. In an embodiment, each user of the user community 112 accesses the same intermediary. For example, the user community 112 may access the intermediary 114-1. In an alternative embodiment, each user of the user community 112 may access one or more of the intermediaries 114. The intermediaries 114 may be implemented as HTTP proxy servers, as Web servers, or in some other manner. Other notable functions of the intermediaries 114 are described later with reference to FIGS. 2 and 3. In operation, as illustrated in FIG. 1 with a dashed double arrow, a user from the user community 112, such as the user 112-N, may access an intermediary, such as the intermediary 114-N, through the network 110. The intermediary 114-N, in turn, may access a server, such as the server 108-N, through the network 110.

Figure 2:
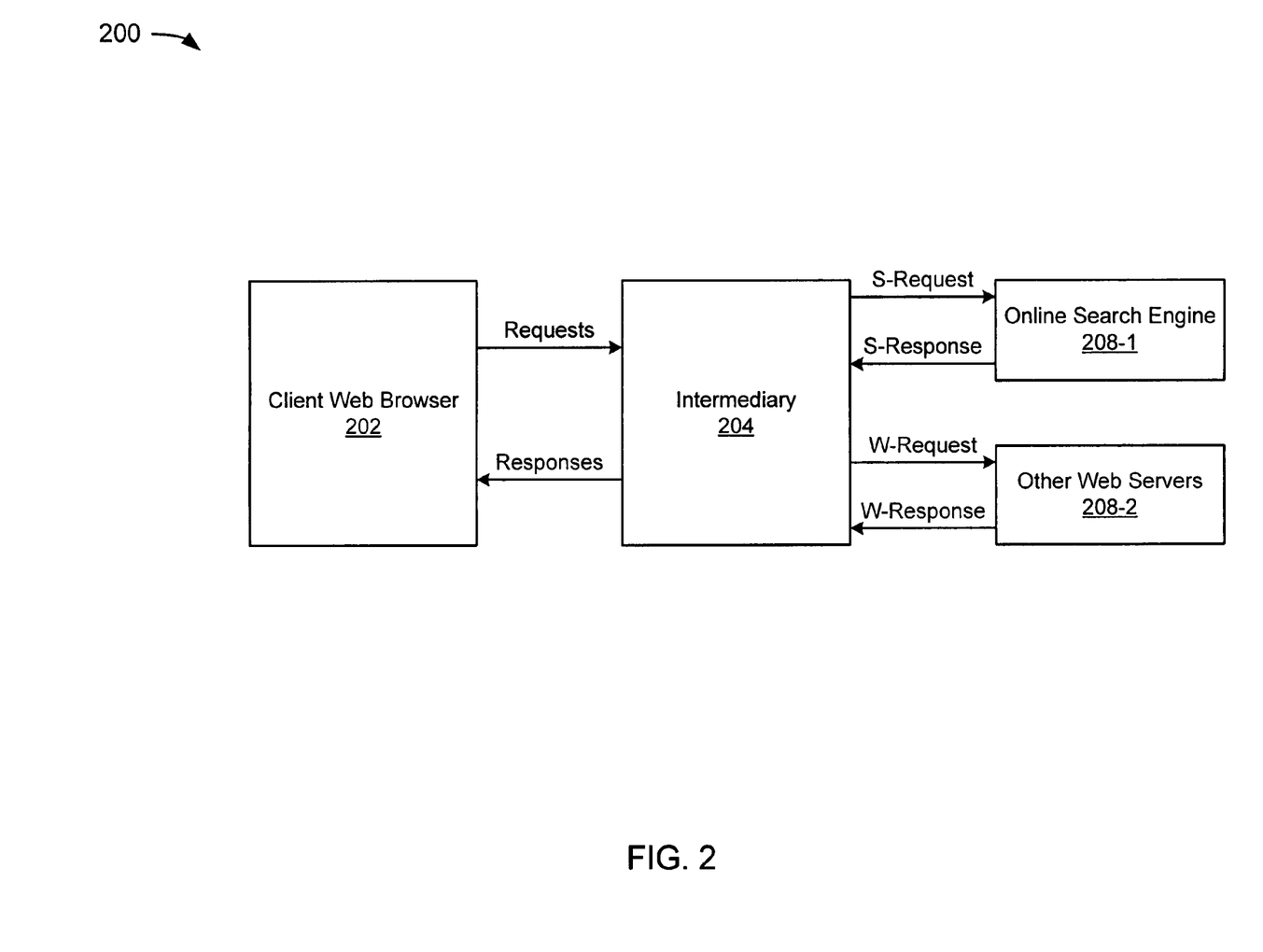
FIG. 2 depicts a conceptual view of client, intermediary, and server components for use in the system of FIG. 1, according to an embodiment.

FIG. 2 depicts a conceptual view 200 of client, intermediary, and server components for use in the system 100 (FIG. 1), according to an embodiment. FIG. 2 is intended to illustrate the relationship between a user, an intermediary, and servers (which, in the example of FIG. 2, are categorized as either online search engines or other web servers). The conceptual view 200 includes a client web browser 202, an intermediary 204, an online search engine 208-1, and other web servers 208-2.

In the example of FIG. 2, the client web browser 202 may be associated with a user of a user community (see, e.g., user community 102 or user community 112 of FIG. 1). The intermediary 204 is associated with the user (see, e.g., intermediary 104 or intermediaries 114 of FIG. 1). The online search engine 208-1 is accessible from the intermediary 204 (see, e.g., servers 108 of FIG. 1). The other web servers 208-2 are also accessible from the intermediary 204 (see, e.g., servers 108 of FIG. 1).

In operation, the client web browser 202 sends requests to the intermediary 204. It may be noted that the sending of requests typically requires the use of both software and hardware components, as is well-known in the art of computer networking, but for the purpose of descriptive simplicity, the client web browser 202 is referred to as the sender of requests (and receiver of responses).

The intermediary 204 distinguishes requests based upon whether a request is to the online search engine 208-1 or one of the other web servers 208-2. For the purposes of example, a request to the online search engine 208-1 is referred to as an "S-Request" and a request to one of the other web servers 208-2 is referred to as a "W-Request." The purpose of distinguishing between S-Requests and W-Requests, and actions taken when receiving requests, is described later with reference to FIG. 3.

When the online search engine 208-1 receives an S-Request, the online search engine 208-1 replies with an S-Response. When one of the other web servers 208-2 receives a W-Request, the web server replies with a W-Response. In an embodiment, the S-Response is no different than would typically be returned in response to a query of an online search engine, as is well-understood in the art of computer networking. Similarly, the W-Response is no different than would typically be returned in response to a query of a web server, as is well understood in the art of computer networking.

Upon receiving the S-Response or W-Response from the online search engine 208-1 or one of the other web servers 208-2, respectively, the intermediary 204 performs actions that depend upon whether the response is an S-Response or a W-Response, as described later with reference to FIG. 3. In either case, the intermediary 204 sends responses to the client web browser 202.

Figure 3:
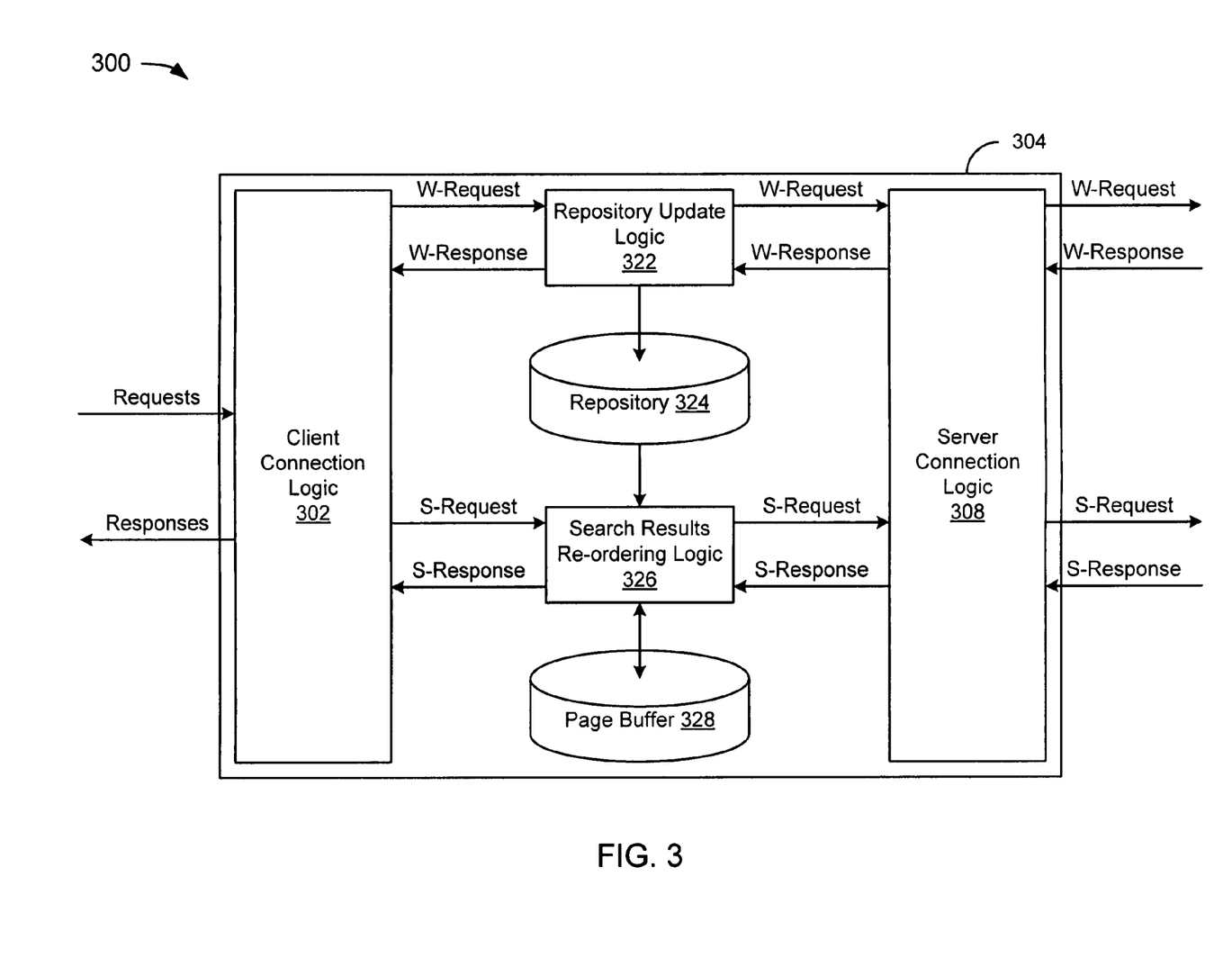
FIG. 3 depicts a conceptual view of an intermediary component for use in the system of FIG. 1, according to an embodiment.

FIG. 3 depicts a conceptual view 300 of an intermediary 304 for use in the system 100 (FIG. 1), according to an embodiment. The intermediary 304 includes client connection logic 302, server connection logic 308, repository update logic 322, a repository 324, search results re-ordering logic 326, and a page buffer 328. It may be noted that each of the components may share resources and/or overlap. For example, the client connection logic 302 and the server connection logic 308 could use the same network or modem interface (see, e.g., the intermediaries 114 of FIG. 1).

In the example of FIG. 3, the client connection logic 302 receives requests from a user (not shown). The requests may be, for example, HTTP requests. The client connection logic 302 distinguishes between a search request ("S-Request") and a normal query of, for example, a web page ("W-Request"). As is known in the art of computer networking, search queries and other queries have characteristics that are sufficiently distinct (even though search queries and other queries often have the same fields) that distinguishing between search queries and other queries is possible, assuming one is motivated to do so. Accordingly, the client connection logic 302 may sort the W-Requests and S-Requests and forward the requests as appropriate for the request type.

In the example of FIG. 3, if the client connection logic 302 receives a W-Request, the W-Request is provided to the repository update logic 322. The server connection logic 308 receives and transmits the W-Request to a server (not shown). In an embodiment, the server connection logic 308 is configured to forward requests to external web services (and receive results). In this embodiment, the server connection logic 308 may be functionally equivalent to HTTP proxies, which are known in the art of computer networking. The server connection logic 308 receives a W-Response from the server and sends the W-Response to the repository update logic 322. The repository update logic 322 sends the W-Response to the client connection logic 302, which transmits responses to the user.

In an alternative embodiment, the W-Request is duplicated and sent to the repository update logic 322 and the server connection logic 308 simultaneously. In this alternative embodiment, the repository update logic 322 need not forward the W-Request to the server connection logic 308. Rather, the client connection logic 302 forwards the W-Request directly to the server connection logic 308. Similarly, in another alternative embodiment, the W-Response is duplicated and sent to the repository update logic 322 and the client connection logic 302 simultaneously.

At any time after which the W-Request or the W-Response is received at the repository update logic 322, the repository update logic 322 may update the repository 324. In an embodiment, the repository update logic 322 updates the repository 324 after receiving the W-Request and again after receiving the W-Response. In another embodiment, the repository update logic 322 may update the repository 324 after receiving the W-Request, but not after receiving the W-Response. In another embodiment, the repository update logic 322 may update the repository 324 only after receiving the W-Response.

In an embodiment, when updating the repository 324, the repository update logic 322 checks if a referral URL for the W-Request is a search results page. If so, the repository update logic 322 updates the repository 324 by creating a key that is a combination of the search expression in canonical form and the target URL for the request. If the key does not exist in the repository, the repository update logic 322 creates an entry for the key. In an embodiment, when the W-Response comes back from the server connection logic 308, the repository update logic 322 checks the status of the W-Response. If the response is OK, the repository update logic 322 increments a counter of page visits in the repository entry for the page. Otherwise, if the response is not OK, the status code is stored in the repository entry for the page. An example of a non-OK code is "404," which means that the page does not exist.

The repository 324 may include a database table that is indexed by the key created by the repository update logic 322. The repository 324 may be designed such that it can be searched based on the associated search expression in canonical form or a search expression in canonical form associated with the URL of a page.

Figure 4:
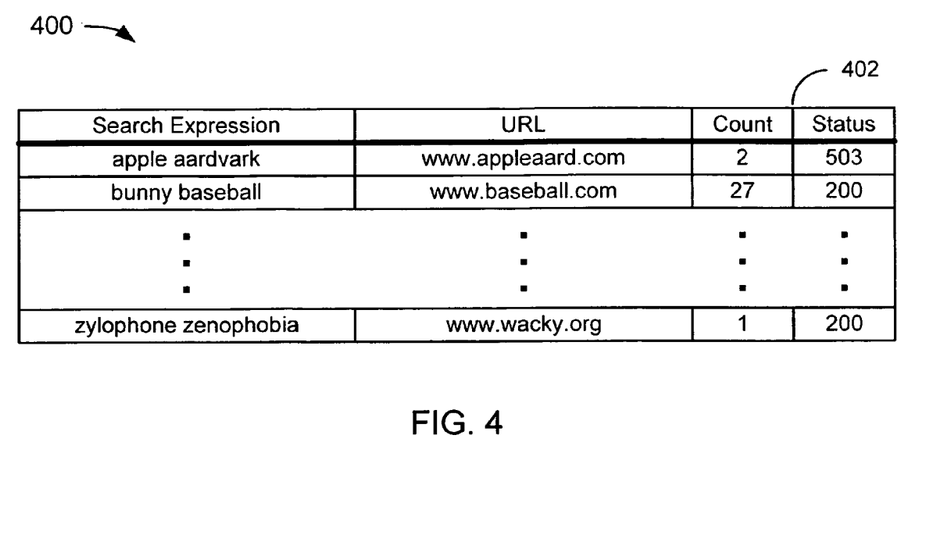
FIG. 4 depicts a conceptual view of a repository database table for use in an embodiment.

An example of such a table is illustrated in FIG. 4, which depicts a conceptual view 400 of a database table 402 for use in an embodiment. In the example of FIG. 4, the table 402 includes four columns: Search Expression, URL, Count, and Status. In various embodiments, there may be more or fewer columns. Count represents the number of times the URL has been accessed following a search for the associated search expression. Status represents the validity of the URL. In an embodiment, the value in the status column is 200 for valid (e.g., reachable) URLs and an error code for invalid (e.g., unreachable) URLs.

For illustrative purposes, the search expression in canonical form is a list of values that are implicitly connected by the word AND. Thus, the value "apple aardvark" means "apple AND aardvark" (or its logical equivalent). Other canonical representations are possible in various implementations. For example, where a search expression include multiple ANDed terms, the terms may be represented as an alphabetized list. In this way, the canonical search expression "aardvark apple" would be the same for apple AND aardvark and aardvark AND apple. All possible canonical search expression representations would be practically impossible to list, but almost any canonical search expression representation could be used.

In the first row of the table 402, the values are "apple aardvark", www.appleaard.com, 2, and 503, respectively. The term "apple aardvark" is representative of a search for apple AND aardvark (or its logical equivalent). The URL associated with the search is www.appleaard.com. In other words, the first row is associated with a search form that includes the search "apple AND aardvark" (or its logical equivalent) with a target URL of www.appleaard.com. In an embodiment, the combination of the search expression and the target URL may be used as a key. In an alternative, the search expression is a primary key and the target URL is a secondary key. The value of 2 in the Count column may indicate that the site has been accessed twice successfully, but the value in the Status column may indicate the last attempted access returned an error code of 503, which means, for example, that the server is currently unable to handle the request due to a temporary overloading or maintenance of the server. Error codes are well-known in the art of computer networking, so an exhaustive list of potential error codes is omitted.

In the second row of the table 402, the values are "bunny baseball", www.basebal.com, 27, and 200 respectively. Accordingly, the second row is associated with a search form that includes the search "bunny AND baseball" (or its logical equivalent) with a target URL of www.baseball.com that has been accessed 27 times successfully, and has a status of 200, which is intended to represent the lack of an error code (e.g., the status is OK).

The table 402 is provided for illustrative purposes only. The columns could be modified and, of course, the values of each row would depend upon search results that were previously processed. A different technique for determining status could be implemented, as well.

Returning again to the example of FIG. 3, if the client connection logic 302 receives an S-Request, the S-Request is provided to the search results re-ordering logic 326. The server connection logic 308 receives and transmits the S-Request to a search engine (not shown). The server connection logic 308 receives an S-Response from the search engine and sends the S-Response to the search results re-ordering logic 326. The search results re-ordering logic 326 sends the S-Response to the client connection logic 302, which transmits responses to the user.

In an embodiment, when the search results re-ordering logic 326 receives the S-Response, the search results re-ordering logic 326 searches the repository 324 to see if there exists any matching entry for the search expression. If not, the S-Response is simply forwarded to the client connection logic 302. However, if a matching entry exists in the repository 324, then the search results re-ordering logic 326 may perform additional actions that are associated with re-ordering search results.

For example, if the S-Response from the search engine includes more than one page, the search results re-ordering logic 326 may download all of the pages and store them in the page buffer 328. Thus, the page buffer 328 may be represented as a table that include a search expression, a page number, and the contents of each page, such as is illustrated in FIG. 5.

Figure 5:
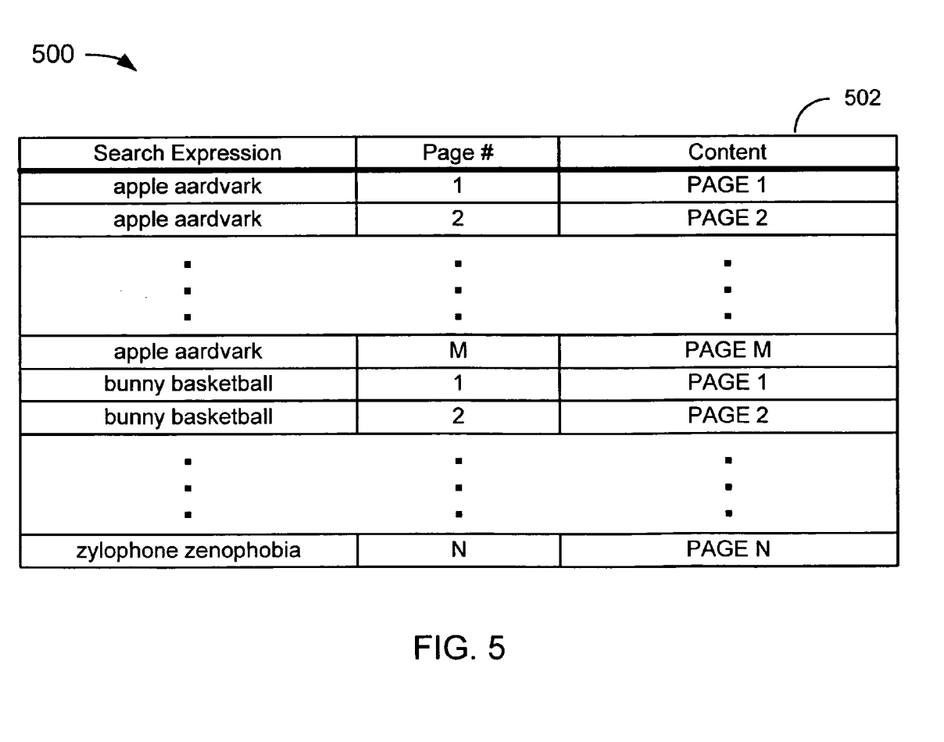
FIG. 5 depicts a conceptual view of a page buffer database table for use in an embodiment.

FIG. 5 depicts a conceptual view 500 of a database table 502 for use in an embodiment. In the example of FIG. 5, the table 502 includes three columns: Search Expression, Page Number, and Content. Search Expression is similar to the search expression described with reference to FIG. 4. Page Number may simply be an ordinal number. Content is illustrated in FIG. 5 as "PAGE X," where PAGE X is intended to mean the contents of page number X for the associated search expression. Thus, the database table 502 includes buffered web pages.

Returning again to the example of FIG. 3, it may be noted that although the search results re-ordering logic 326 is described above as downloading the pages, some other component (such as the server connection logic 308) may be involved in the downloading process. The downloaded pages may be referred to as the set of pages returned by the search engine for a specific search expression (hereinafter, "the set"). After the set has been downloaded, additional processing may occur.

For example, the search results re-ordering logic 326 may search the repository 324 for the elements of the set that have an associated entry. So, if the page buffer 328 includes an entry associated with the search expression "apple AND aardvark" (or its logical equivalent) and the repository 324 includes an entry associated with the search expression "apple AND aardvark" (or its logical equivalent), then the search results re-ordering logic 326 may find a match. The search may reveal a subset of the elements of the set that have an associated entry in the repository 324 (hereinafter, "subset 1 "). The remaining elements of the set presumably do not match ("subset 2").

The search results re-ordering logic 326 may split subset 1 into valid entries (hereinafter, "subset 1-1") and invalid entries (hereinafter, "subset 1-2"). Valid entries are those entries that have a status of OK (e.g., web pages that can be accessed). Invalid entries are those entries that have an associated error (e.g., web pages that cannot be reached). Subset 1-1 may be ordered according to the number of times the page was visited (e.g., in decreasing order of the counter associated with each page entry). Pages that do not have an entry may be left in the order they were received. Subset 1-2 may be ordered according to the degree of severity of the associated error (e.g., 404 errors (Not Found) are deemed severe, while 503 errors (Service Unavailable) are deemed less severe because the page is likely to be available later).

The search results re-ordering logic 326 may create a new set of pages (hereinafter, "the new set") that includes, in order, subset 1-1, subset 2, and subset 1-2. The new set is thus ordered so that valid entries that have been accessed in the past come first (with the most popular valid entries at the front), entries that have not been shown to be invalid come next, and invalid entries come last (where the invalid entries with the most severe associated errors are at the end). The search results re-ordering logic 326 may place the (old) set with the new set in the page buffer 328.

The search results re-ordering logic 326 may return the first page of the new set to the client connection logic 302 as the (updated) S-Response. This action may or may not include returning the new set or a first part of the new set to the client connection logic 302. On subsequent calls for the next page results, additional pages may be provided from the page buffer.

As described above, the intermediary 304 facilitates personalization of search results for a user. Advantageously, the user need not provide explicit feedback by, for example, saying which pages are relevant. Rather, feedback is implicit and invisible to the user because feedback is extracted from which pages are clicked on a search results page. Moreover, all of the personalization occurs in the intermediary 304, making it unnecessary to return to a search engine to refine searches. In addition, feedback can be shared between different sessions for a given user, and even between different users.

Figure 6:
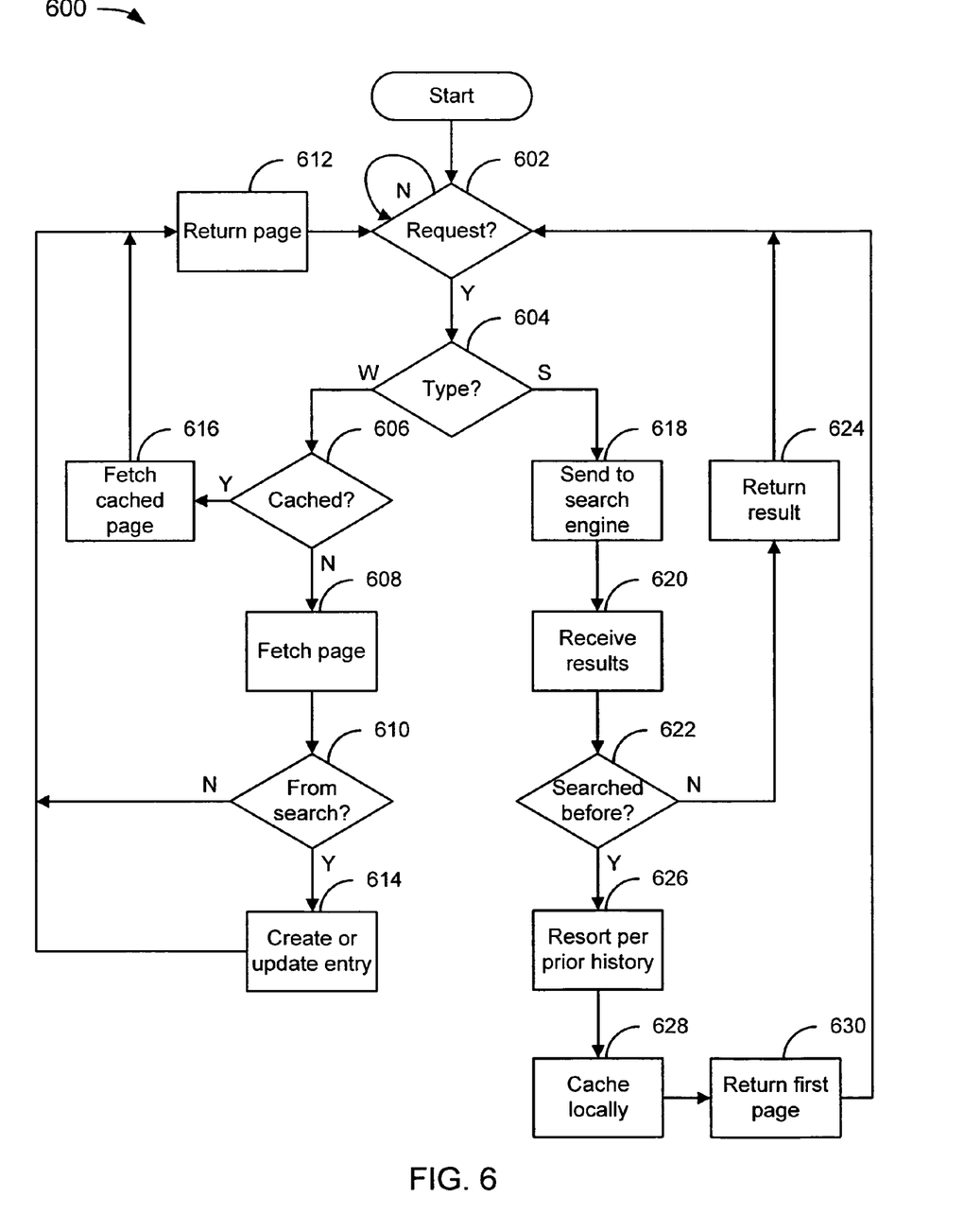
FIG. 6 depicts a flowchart of a method according to an embodiment.

FIG. 6 depicts a flowchart 600 of a method according to an embodiment. FIG. 6 is intended to illustrate actions that may be carried out by an intermediary, such as the intermediary 304 (FIG. 3). This method and other methods are depicted as serially arranged modules. However, modules of the methods may be reordered, or arranged for parallel execution as appropriate.

In an embodiment, the flowchart 600 starts at decision point 602 with determining whether a request has been received. If it is determined that a request has not been received (602-N), the flowchart 600 continuously loops until a request is received. If it is determined that a request has been received (602-Y), then the flowchart 600 continues at decision point 604 with determining what type of request has been received. If it is determined that the request is a W-Request (604-W), then the flowchart 600 continues at decision point 606. If, on the other hand, it is determined that the request is an S-Request (604-S), then the flowchart continues at block 618.

In an embodiment, for a W-Request, at decision point 606 it is determined whether the page associated with the W-Request has been placed in the page buffer. When a page has been placed in the page buffer, the page may be referred to as being "cached." If it is determined that the page has not been cached (606-N), then the flowchart 600 continues at block 608 with fetching the page. The flowchart 600 then continues at decision point 610 with determining whether the page is from a search results page (e.g., the referral URL is a search results page). If not (610-N), then the flowchart 600 continues at block 612 with returning the page. If so (610-Y), then the flowchart 600 continues at block 614 with creating or updating an entry and at block 612 with returning the page. In an embodiment, if at decision point 606 it has been determined that the page has been cached (606-Y), the flowchart 600 continues at block 616 with fetching the cached page and at block 612 with returning the page. After returning the page at block 612, the flowchart 600 returns to the decision point 602, which was described previously.

In an embodiment, for an S-Request, at block 618 the S-Request is sent to a search engine and the flowchart 600 continues at block 620 with receiving the results from the search engine. The flowchart 600 continues at decision point 622 with determining whether the same logical search has been performed before. If the same logical search has not been performed (622-N), then the result ("S-Response") is returned at block 624 and the flowchart 600 returns to the decision point 602. If, on the other hand, the same logical search has been performed (622-Y) then the flowchart 600 continues at block 626 with re-sorting the results according to prior search results, at block 628 with caching the results locally, and at block 630 with returning the first page of the re-sorted results. The flowchart 600 then returns to the decision point 602, which was described previously.

Figure 7:
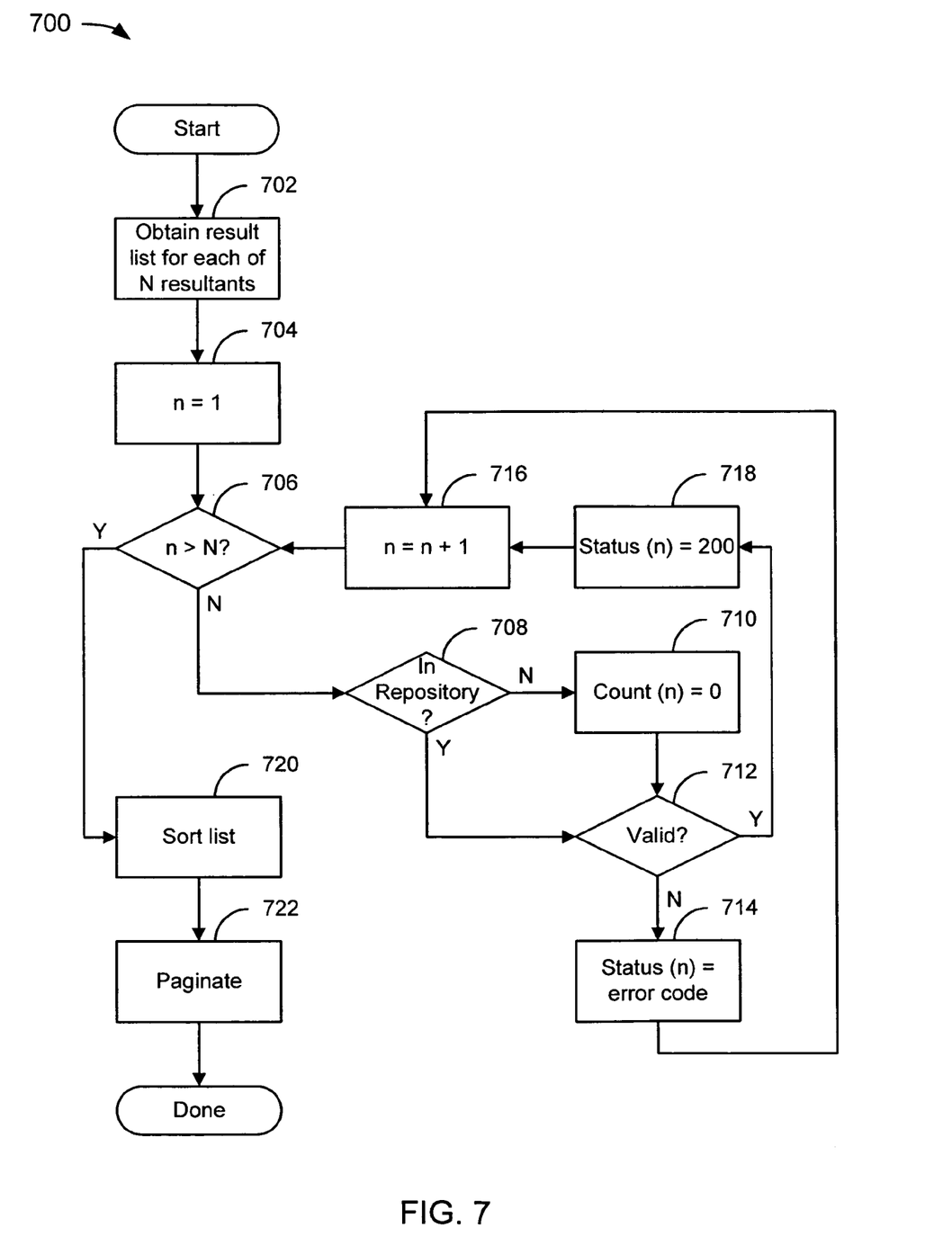
FIG. 7 depicts a flowchart of a method according to an embodiment.

FIG. 7 depicts a flowchart 700 of a method according to an embodiment. FIG. 7 is intended to illustrate actions that may be carried out by an intermediary, such as the intermediary 304 (FIG. 3). In an embodiment, the flowchart 700 may replace block 626 (FIG. 6). In other words, in an embodiment, the flowchart 700 may be considered a more detailed description of block 626.

The flowchart 700 starts at block 702 with obtaining a result list for each of "N" resultants. The flowchart 700 continues at block 704 with setting a variable "n" to 1. The flowchart 700 continues at decision point 706 where it is determined whether n is greater than N. Assuming there is at least one resultant in the result list, n will not be greater than n in a first iteration from decision point 706. In a first iteration from decision point 706, resultant n will be the first resultant in the resultant list (i.e. resultant 1). In the last iteration from decision point 706, resultant n will be the last resultant in the resultant list (i.e., resultant N).

If it is determined that n is not greater than N (706-N), then the flowchart 700 continues at decision point 708 where it is determined whether resultant n is already stored in a repository. If it is determined that resultant n not stored in the repository (708-N), then the flowchart 700 continues at block 710 where the count associated with resultant n ("Count (n)") is initialized to 0. If, on the other hand, it is determined that the resultant n is stored in the repository (708-Y), then there is no need to initialize the count associated with resultant n. In either case, whether the count is initialized or not, the flowchart continues at decision point 712 where it is determined whether resultant n is valid.

For the purposes of example, the resultant n is considered to be invalid if a URL associated with the resultant n is associated with an error code. For example, if the resultant n is associated with the URL www.appleaard.com, but www.appleaard.com is not available, then the resultant n will have an associated error code. If it is determined that the resultant n is invalid (712-N), the flowchart 700 continues at block 714 where the status associated with the resultant n ("Status (n)") is set to the associated error code. Then the flowchart 700 continues at block 716 where the variable n is incremented and the flowchart 700 returns to decision block 706. If, on the other hand, it is determined that n is valid (712-Y), the flowchart 700 continues at block 718 where Status (n) is set to 200. In the example of FIG. 7, a status of 200 is indicative of validity. The flowchart 700 continues at block 716 where the variable n is incremented and the flowchart returns to decision block 706.

Each time the flowchart performs an iteration from decision block 706, n is incremented. Eventually, after considering each resultant in the list of N resultants, the variable n will be greater than N. When it is determined that n is greater than n (706-Y), the flowchart 700 continues to block 720 where the list is sorted. In an embodiment, the list may be sorted such that valid entries with the highest count values are first, followed by invalid entries arranged in order of the severity of their associated error codes.

The flowchart 700 continues at block 722 with pagination and then is done. Pagination may involve breaking the sorted resultants up into pages consisting of a number of resultant links. For example, each page may include 20 resultants. It should be noted that pagination may occur after the resultants are cached (see, e.g., block 628 of FIG. 6).

Figure 8A:
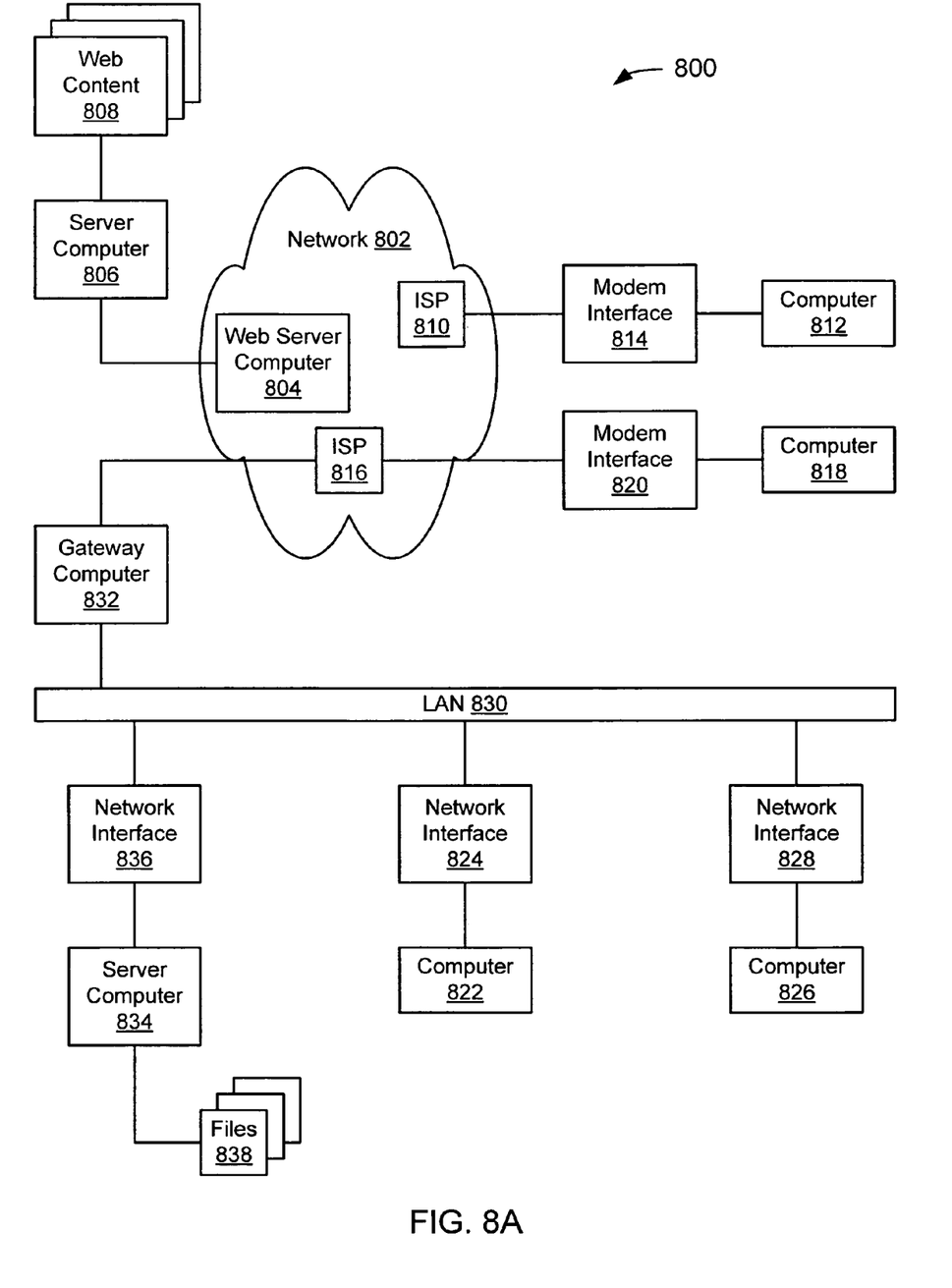
FIGS. 8A and 8B depict an alternative conceptual view of a system according to an embodiment.
Figure 8B:
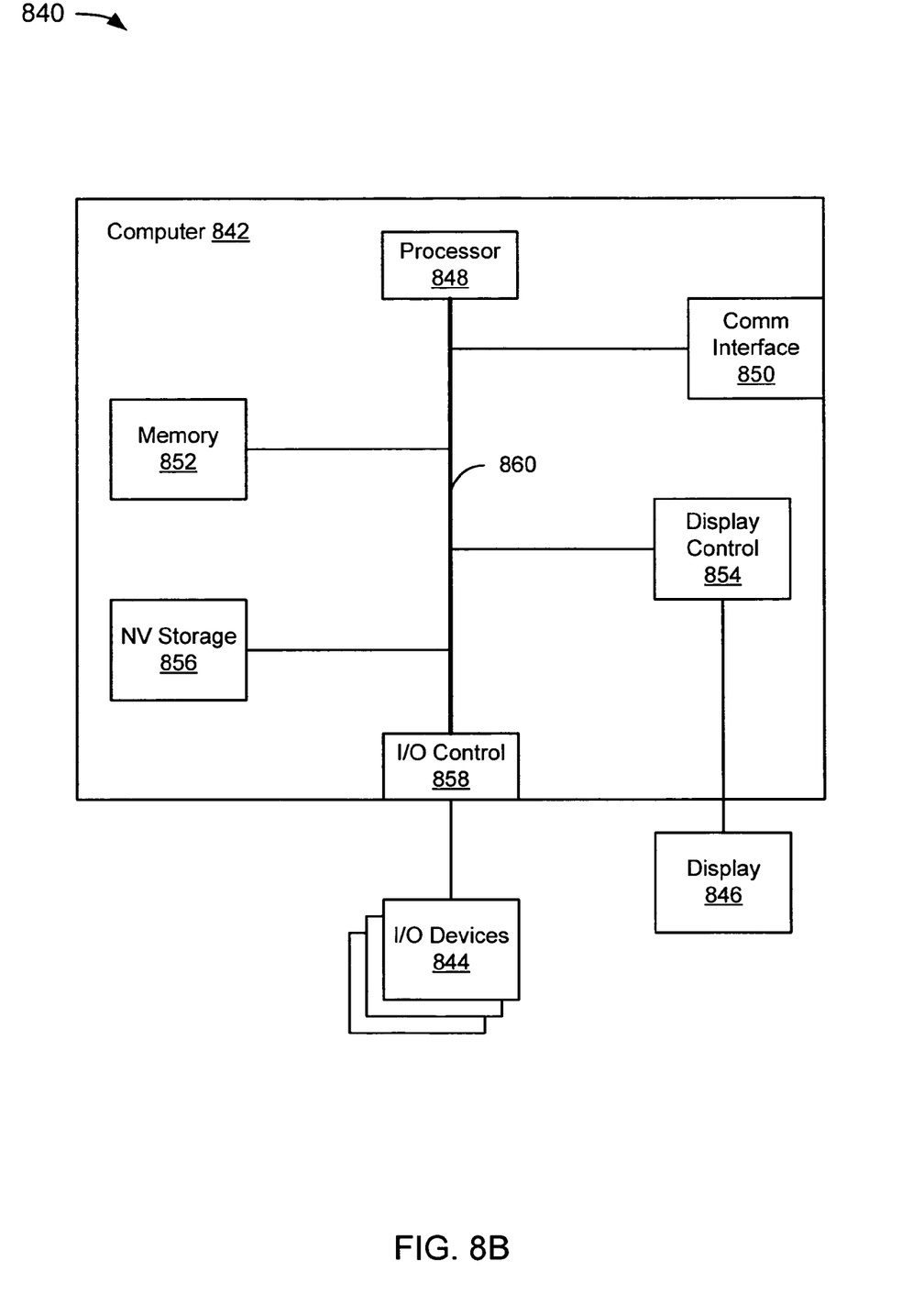

FIGS. 8A and 8B depict a conceptual view of a system on which an object space with active objects may be implemented according to an embodiment. The following description of FIGS. 8A and 8B is intended to provide an overview of computer hardware and other operating components suitable for performing the methods of embodiments described herein, but is not intended to limit the applicable environments. Similarly, the computer hardware and other operating components may be suitable as part of the apparatuses of embodiments described herein. Other embodiments can be practiced with other computer system configurations, including hand-held devices, multiprocessor systems, microprocessor-based or programmable consumer electronics, network PCs, minicomputers, mainframe computers, and the like. Other embodiments can also be practiced in distributed computing environments where tasks are performed by remote processing devices that are linked through a communications network.

FIG. 8A depicts a networked system 800 that includes several computer systems coupled together through a network 802, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web). The physical connections of the Internet and the protocols and communication procedures of the Internet are well known to those of skill in the art.

The web server computer 804 is typically at least one computer system which operates as a server computer system and is configured to operate with the protocols of the World Wide Web and is coupled to the Internet. The web server computer 804 can be a conventional server computer system. Optionally, the web server computer 804 can be part of an ISP which provides access to the Internet for client systems. The web server computer 804 is shown coupled to the server computer 806 which itself is coupled to web content 808, which can be considered a form of a media database. While two computers 804 and 806 are shown in FIG. 8A, the web server computer 804 and the server computer 806 can be one computer system having different software components providing the web server functionality and the server functionality provided by the server computer 806, which will be described further below.

Access to the network 802 is typically provided by Internet service providers (ISPs), such as the ISPs 810 and 816. Users on client systems, such as client computer systems 812, 818, 822, and 826 obtain access to the Internet through the ISPs 810 and 816. Access to the Internet allows users of the client computer systems to exchange information, receive and send e-mails, and view documents, such as documents which have been prepared in the HTML format. These documents are often provided by web servers, such as web server 804, which are referred to as being "on" the Internet. Often these web servers are provided by the ISPs, such as ISP 810, although a computer system can be set up and connected to the Internet without that system also being an ISP.

Client computer systems 812, 818, 822, and 826 can each, with the appropriate web browsing software, view HTML pages provided by the web server 804. The ISP 810 provides Internet connectivity to the client computer system 812 through the modem interface 814, which can be considered part of the client computer system 812. The client computer system can be a personal computer system, a network computer, a web TV system, or other computer system. While FIG. 8A shows the modem interface 814 generically as a "modem," the interface can be an analog modem, ISDN modem, cable modem, satellite transmission interface (e.g. "direct PC"), or other interface for coupling a computer system to other computer systems.

Similar to the ISP 814, the ISP 816 provides Internet connectivity for client systems 818, 822, and 826, although as shown in FIG. 8A, the connections are not the same for these three computer systems. Client computer system 818 is coupled through a modem interface 820 while client computer systems 822 and 826 are part of a LAN 830.

Client computer systems 822 and 826 are coupled to the LAN 830 through network interfaces 824 and 828, which can be Ethernet network or other network interfaces. The LAN 830 is also coupled to a gateway computer system 832 which can provide firewall and other Internet-related services for the local area network. This gateway computer system 832 is coupled to the ISP 816 to provide Internet connectivity to the client computer systems 822 and 826. The gateway computer system 832 can be a conventional server computer system.

Alternatively, a server computer system 834 can be directly coupled to the LAN 830 through a network interface 836 to provide files 838 and other services to the clients 822 and 826, without the need to connect to the Internet through the gateway system 832.

FIG. 8B depicts a computer system 840 for use in the system 800 (FIG. 8A). The computer system 840 may be a conventional computer system that can be used as a client computer system or a server computer system or as a web server computer system. Such a computer system can be used to perform many of the functions of an Internet service provider, such as ISP 810 (FIG. 8A). The computer system 840 includes a computer 842, I/O devices 844, and a display device 846. The computer 842 includes a processor 848, a communications interface 850, memory 852, display controller 854, non-volatile storage 856, and I/O controller 858. The computer system 840 may be couple to or include the I/O devices 844 and display device 846.

The computer 842 interfaces to external systems through the communications interface 850, which may include a modem or network interface. It will be appreciated that the communications interface 850 can be considered to be part of the computer system 840 or a part of the computer 842. The communications interface can be an analog modem, isdn modem, cable modem, token ring interface, satellite transmission interface (e.g. "direct PC"), or other interfaces for coupling a computer system to other computer systems.

The processor 848 may be, for example, a conventional microprocessor such as an Intel Pentium microprocessor or Motorola power PC microprocessor. The memory 852 is coupled to the processor 848 by a bus 860. The memory 852 can be dynamic random access memory (DRAM) and can also include static ram (SRAM). The bus 860 couples the processor 848 to the memory 852, also to the non-volatile storage 856, to the display controller 854, and to the I/O controller 858.

The I/O devices 844 can include a keyboard, disk drives, printers, a scanner, and other input and output devices, including a mouse or other pointing device. The display controller 854 may control in the conventional manner a display on the display device 846, which can be, for example, a cathode ray tube (CRT) or liquid crystal display (LCD). The display controller 854 and the I/O controller 858 can be implemented with conventional well known technology.

The non-volatile storage 856 is often a magnetic hard disk, an optical disk, or another form of storage for large amounts of data. Some of this data is often written, by a direct memory access process, into memory 852 during execution of software in the computer 842. One of skill in the art will immediately recognize that the terms "machine-readable medium" or "computer-readable medium" includes any type of storage device that is accessible by the processor 848 and also encompasses a carrier wave that encodes a data signal.

The computer system 840 is one example of many possible computer systems which have different architectures. For example, personal computers based on an Intel microprocessor often have multiple buses, one of which can be an I/O bus for the peripherals and one that directly connects the processor 848 and the memory 852 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 852 for execution by the processor 848. A Web TV system, which is known in the art, is also considered to be a computer system according to the present invention, but it may lack some of the features shown in FIG. 8B, such as certain input or output devices. A typical computer system will usually include at least a processor, memory, and a bus coupling the memory to the processor.

In addition, the computer system 840 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 856 and causes the processor 848 to execute the various acts required by the operating system to input and output data and to store data in memory, including storing files on the non-volatile storage 856.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-roms, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the present invention is not described with reference to any particular programming language, and various embodiments may thus be implemented using a variety of programming languages.

An interesting advantage of an aspect of the teachings described herein is that if a proxy has a notion of user authentication, it is possible to control the scope of the sharing of links. This may be useful for maintaining privacy.

Another interesting advantage of an aspect is that multiple proxy servers can collaborate and share data. For example, multiple instances of intermediaries can collaborate by exchanging the content of their repositories and building a "consolidated" repository. Of course, consolidated repositories must be appropriately limited or the advantages of repositories customized for a user community become averaged over multiple user communities, and can become meaningless.

Another interesting advantage of an aspect is that results coming back from an online search engine are re-ordered to improve relevance to a user community. However, re-ordering need not be the only operation performed by the intermediary. For instance, the intermediary may remove pages from the results. Alternatively (or in addition), the intermediary may propose pages from closely related searches. For example, if a user submits three keywords, the intermediary might suggest pages returned by a search on only two of the three keywords, which are not included in the results of the search on the three keywords.

As used herein, a "user community" is a group of users with network access habits are similar. For example, a user community may include a group of users who have Web surfing habits that are sufficiently similar that a re-ordering of search results from a search engine brings more relevant search results to the top. For users that are part of the user community, this results in an improvement to their use of the search engine.

As used herein, a request URL refers to the target of a request. For example, if a user tries to go to www.sap.com, then the request URL is www.sap.com. As used herein, a referral URL refers to the page at which a request is generated. For example, if a user searches for "SAP" at www.google.com, the user is provided a list of links, which, for the purposes of this example, includes www.sap.com. If the user clicks on the link to www.sap.com, then the request URL is www.sap.com and the referral URL is www.google.com/search?hl=en&q=sap.

It may be noted that according to HTTP protocol version 1.1, a request to a web server may contain a referral URL in addition to a request URL. The request URL is the URL of the page the user wants to see, while the referral URL is the URL of the page on which the user clicked a link that generated the request for the request URL. For example, if a user is looking at page A and clicks on a link to page B, the user's web browser sends a request to the web server that hosts page B. This request will contain the URL of page B as the request URL and the URL of page A as the referral URL. The official document specifying the HTTP 1.1 protocol is the RFC 2616, which is available at http://www.faqs.org/rfcs/rfc2616.html, which is incorporated herein by reference. Section 5.1.2 of the document defines the term "Request URI." As used herein, the term Request URL, is used to refer to the address of a target Web page. Section 14.36 of the document defines the optional field "referrer" that can be included in the header of a request. As used herein, the term Referral URL is used to refer to the address of referring Web page.

As used herein, the canonical form of a search expression is understood to include a number of different forms that are known in the art. Typically, though not necessarily, a query expression is a Boolean expression. Most search engines, for example, expect a Boolean expression. As described above, search expressions are used to build a key that is useful for accessing a repository (e.g., the repository 324 of FIG. 3). Accordingly, it is desirable to express two logically equivalent search expressions the same. In mathematical terms, there may be two expressions for the same function. For example, the search expression "beans AND bacon" is the logical equivalent of the search expression "bacon AND beans." The canonical form of two expressions with the same function is the same.

Canonical forms of search expressions are well-known in the art of computer science. The best-known canonical forms for Boolean functions are sum-of-minterms (SOP) and product-of-maxterms (POS). There exists a vast body of literature on the subject of algorithmic techniques for finding the minimized standard form of a Boolean expression.

While this invention has been described in terms of certain embodiments, it will be appreciated by those skilled in the art that certain modifications, permutations and equivalents thereof are within the inventive scope of the present invention. It is therefore intended that the following appended claims include all such modifications, permutations and equivalents as fall within the true spirit and scope of the present invention; the invention is limited only by the claims.

What is claimed is:

1. A computer-implemented method, comprising:
   coupling a plurality of clients to a first network;
   coupling a search engine to a second network configured to provide search results in response to search requests; and
   coupling an intermediary between the first network and the second network, the intermediary configured to:
   intercept a first request for search results from a client on the first network to the search engine on the second network, wherein the first request includes a search expression;
   intercept search results from the search engine on the second network to the client on the first network, wherein the search results include a URL;
   intercept a second request for the URL from the client on the first network; and
   associate the search expression with the URL.

2. The method of claim 1, further comprising initializing a count to zero for the URL in the search results if the URL is not associated with the search expression in the prior history.

3. The method of claim 1, further comprising setting a status to an error code associated with the URL in the search results.

4. The method of claim 1, further comprising caching the sorted search results locally.

5. The method of claim 1, wherein said user is a first user, further comprising:
receiving a request for the URL from a second user; and
if a page associated with the URL is cached locally,
fetching the cached page; and
returning the cached page to the second user.

6. The method of claim 1, further comprising:
receiving a request for a requested URL, wherein the request includes a referral URL;
fetching a page associated with the requested URL; and
creating an entry in a repository if the referral URL is associated with a search engine.

7. The method of claim 6, wherein said request is a first request, further comprising:
receiving a second request for the requested URL, wherein the second request includes the referral URL;
fetching the page associated with the requested URL; and
updating the entry in the repository.

8. The method of claim 1, further comprising:
receiving a request for a requested URL, wherein the request includes a search expression;
fetching a page associated with the requested URL; and
creating an entry in a repository, wherein the entry is associated with the search expression and the requested URL.

9. The method of claim 8, wherein said request is a first request, further comprising:
receiving a second request for the requested URL, wherein the second request includes the search expression;
fetching the page associated with the requested URL; and
updating the entry in the repository.

10. The method of claim 1, further comprising:
receiving a request for a requested URL, wherein the request includes a referral URL and a search expression;
fetching a page associated with the requested URL; and
creating an entry in a repository if the referral URL is associated with a search engine, wherein the entry is associated with the search expression and the requested URL.

11. The method of claim 10, wherein said request is a first request, further comprising:
receiving a second request for a requested URL, wherein the second request includes the referral URL and the search expression;
fetching the page associated with the requested URL; and
updating the entry in the repository.

12. A computer-implemented system, comprising:
a plurality of clients coupled to a first network;
a search engine coupled to a second network configured to provide search results in response to search requests; and
an intermediary, coupled between the first network and the second network, the intermediary configured to:
intercept a first request for search results from a client on the first network to the search engine on the second network, wherein the first request includes a search expression;
intercept search results from the search engine on the second network to the client on the first network, wherein the search results include a URL;
intercept a second request for the URL from the client on the first network; and
associate the search expression with the URL.

13. The computer-implemented system of claim 12, wherein said client is a first client, said search results are first search results, and said intermediary is further configured to:
intercept a third request for search results from a second client to the search engine, wherein the third request includes the search expression;
intercept second search results from the search engine to the second client, wherein the second search results include the URL; and
re-ordering the second search results according to prior history that includes the search expression and the URL.

14. The computer-implemented system of claim 12, wherein the second network is the Internet.

15. A computer-implemented system including a processor and a computer-readable medium for storing data and executable code, the system comprising:
client connection logic configured to receive search requests from a plurality of clients and to transmit search responses, in reply to the search requests, to the clients;
server connection logic configured to transmit the search requests to a plurality of servers and to receive the search responses from the servers;
a repository;
repository update logic, coupled to the client connection logic and the server connection logic, configured to update the repository based on the search requests and the search responses; and
search results re-ordering logic, coupled to the client connection logic and the server connection logic, configured to re-order search results from a subset of the search responses in accordance with a number of times URLs associated with the search results have been requested.

16. The computer-implemented system of claim 15, wherein said repository update logic is further configured to update the repository in response to an intercepted search request from a client, intercepted search results associated with the search request, and an intercepted URL request from the client, wherein the URL request is associated with the search results.

17. The computer-implemented system of claim 15, further comprising a page buffer, wherein said search results re-ordering logic re-orders the search results in the page buffer.

18. A computer-implemented system including a processor and a computer-readable medium for storing data and executable code, the system comprising:
client connection logic configured to receive search requests from a plurality of clients and to transmit search responses, in reply to the search requests, to the clients;
server connection logic configured to transmit the search requests to a plurality of servers and to receive the search responses from the servers;
a repository;
repository update logic, coupled to the client connection logic and the server connection logic, configured to update the repository based on the search requests and the search responses; and
search results re-ordering logic, coupled to the client connection logic and the server connection logic, configured to re-order search results from a subset of the search responses in accordance with error codes associated with URLs that are associated with the search results.

19. The computer-implemented system of claim 18, wherein said repository update logic is further configured to update the repository in response to an intercepted search request from a client, intercepted search results associated with the search request, and an intercepted URL request from the client, wherein the URL request is associated with the search results.

20. The computer-implemented system of claim 18, further comprising a page buffer, wherein said search results re-ordering logic re-orders the search results in the page buffer.

* * * * *